US012783804B2

(12) United States Patent
Heisler et al.

(10) Patent No.: US 12,783,804 B2
(45) Date of Patent: Nov. 3, 2026

(54) SYSTEM AND METHOD OF LORA CONTRASTIVE DECODING IN LARGE LANGUAGE MODELS

(71) Applicant: HUAWEI CLOUD COMPUTING TECHNOLOGIES CO., LTD., Guizhou (CN)

(72) Inventors: Morgan Lindsay Heisler, Vancouver (CA); Weiwei Zhang, Guizhou (CN); Zhenan Fan, Guizhou (CN); Yong Zhang, Richmond (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 72 days.

(21) Appl. No.: 18/983,602

(22) Filed: Dec. 17, 2024

(65) Prior Publication Data

US 2026/0170245 A1 Jun. 18, 2026

(51) Int. Cl.

*G06F 40/00* (2020.01)
*G06F 40/237* (2020.01)
*G06F 40/284* (2020.01)

(52) U.S. Cl.

CPC .......... *G06F 40/284* (2020.01); *G06F 40/237* (2020.01)

(58) Field of Classification Search

CPC .......... G06N 3/045; G06N 20/00; G06N 3/08; G06N 3/0475; G06N 3/0455; G06N 3/096; G06N 3/0442; G06N 3/0464; G06N 3/047; G06N 3/048; G06N 3/09; G06N 3/091; G06N 3/092; G06N 3/094; G06N 3/0895; G06N 3/088; G06N 3/086; G06N 3/084; G06N 3/082; G06N 5/04; G06N 5/042; G06N 5/043; G06N 5/045; G06N 5/046;

(Continued)

(56) References Cited

U.S. PATENT DOCUMENTS

| | | | | |
|---|---|---|---|---|
| 12,406,207 B2 * | 9/2025 | Turley | ..................... | G06N 5/02 |
| 2025/0103910 A1 * | 3/2025 | Turley | ................ | G06F 16/3344 |

(Continued)

OTHER PUBLICATIONS

Yuan, Xin, Hongliang Fei, and Jinoo Baek. "Efficient transformer adaptation with soft token merging." Proceedings of the IEEE/CVF Conference on Computer Vision and Pattern Recognition. 2024. (Year: 2024).*

(Continued)

*Primary Examiner* — Edgar X Guerra-Erazo
(74) *Attorney, Agent, or Firm* — BCF LLP

(57) ABSTRACT

Methods and systems are disclosed. The method comprises receiving the input text sequence; generating, a first likelihood score for each of a plurality of candidate output tokens using an expert model on the input text sequence, the expert model being a LoRA adapter trained to generate text based on a task; generating a respective second likelihood score for each of the plurality of candidate output tokens using an amateur model on the input text sequence, the amateur model having been previously used to train the expert model; generating a contrastive score for each of the plurality of candidate output tokens by maximizing a positive difference in their respective first likelihood score and second likelihood score; selecting a given candidate output text token as the output token based on the respective contrastive score.

14 Claims, 4 Drawing Sheets

(58) Field of Classification Search
CPC ...... G06F 40/40; G06F 16/3344; G06F 30/27; G06F 40/30; G06F 16/24578; G06F 21/554; G06F 40/20; G06F 40/284; G06F 16/243; G06F 16/2438; G06F 16/3329; G06F 40/56
See application file for complete search history.

(56) References Cited

U.S. PATENT DOCUMENTS

| | | | | |
|---|---|---|---|---|
| 2025/0103962 | A1* | 3/2025 | Turley ................... | G06N 20/00 |
| 2025/0363421 | A1* | 11/2025 | Turley ..................... | G06N 5/02 |
| 2026/0134011 | A1* | 5/2026 | Subramaniyan .. | G06F 16/33295 |

OTHER PUBLICATIONS

Hayou, Soufiane, Nikhil Ghosh, and Bin Yu. "Lora+: Efficient low rank adaptation of large models." arXiv preprint arXiv:2402.12354 (2024). (Year: 2024).*
Ding, Ning, et al. "Sparse low-rank adaptation of pre-trained language models." Proceedings of the 2023 conference on empirical methods in natural language processing. 2023. (Year: 2023).*
Hu et al., LoRA: Low-Rank Adaptation of Large Language Models, Oct. 16, 2021.
Li et al., Contrastive Decoding: Open-ended Text Generation as Optimization, Jul. 10, 2023.
O'Brien et al., Contrastive Decoding Imporives Reasoning in Large Language Models, Sep. 29, 2023.
Phan et al., Distillation Contrastive Decoding: Improving LLMs Reasoning with Contrastive Decoding and Distillation, Aug. 23, 2024.

* cited by examiner

SYSTEM AND METHOD OF LORA CONTRASTIVE DECODING IN LARGE LANGUAGE MODELS

CROSS-REFERENCE TO RELATED APPLICATIONS

This is the first application filed for the instantly disclosed technology.

FIELD

The present technology is generally related to natural language processing, and more particularly to a method and system of LoRA contrastive decoding.

BACKGROUND

Low-Rank Adaptation (LoRA) has gained substantial traction in recent years as a preferred method for fine-tuning large language models (LLMs) due to its efficiency and effectiveness. By utilizing low-rank parameter updates, LoRA allows practitioners to adapt pre-trained models for specific applications while significantly reducing computational costs and memory usage. This capability has made LoRA particularly appealing for commercial applications, where rapid iteration and deployment are essential. As a result, LoRA adapters are increasingly viewed as a robust alternative to full model fine-tuning, enabling organizations to leverage LLMs without incurring the high resource demands traditionally associated with training large models from scratch.

While standard decoding methods, such as greedy sampling and nucleus sampling, have demonstrated effectiveness in generating coherent and contextually relevant text, they often overlook the unique advantages provided by LoRA adapters. Specifically, the dual nature of LoRA, which incorporates both an expert adapter—rich in knowledge—and a base model—possessing more limited capabilities—presents a compelling opportunity for enhancing decoding strategies. This inherent structure allows for more nuanced exploration of the output space, potentially leading to improved text generation outcomes.

A decoding technique, contrastive decoding (CD), leverages such a disparity between two models: an expert LLM alongside a smaller model, referred to as the amateur model. By maximizing the difference between the log-probabilities of these two models, while adhering to plausibility constraints, CD effectively narrows the search to high-probability tokens from the expert model. This focus on the discrepancies between the expert and amateur models allows CD to emphasize desirable outputs that are often overlooked by the weaker model, ensuring a more coherent and informative continuation.

In an article entitled "*Contrastive Decoding: Open-Ended Text Generation as Optimization*", authored by Xiang Lisa Li et al., and published in 2023 in Proceedings of the 61$^{st}$ Annual Meeting of the Association for Computational Linguistics, the content of which is incorporated herein by reference in its entirety, there is disclosed the concept of contrastive decoding as a framework for text generation, highlighting its potential to generate and evaluate diverse candidates.

In an article entitled "*Contrastive Decoding Improves Reasoning in Large Language Models*", authored by Sean O'Brien et al., and published in 2023 in ArXiV, the content of which is incorporated herein by reference in its entirety, this work takes the foundational concept and applies it to a more specialized domain—reasoning within LLMs. It builds on the general principles of contrastive decoding and tailors them to improve specific aspects of output quality, particularly for reasoning tasks.

In an article entitled "*Distillation Contrastive Decoding: Improving LLMs Reasoning with Contrastive Decoding and Distillation*", authored by Phuc Phan et al., and published in 2024 in ArXiv, the content of which is incorporated herein by reference in its entirety, it introduces a distillation component, allowing for the efficient transfer of enhanced reasoning capabilities from larger models to smaller ones. This adds an extra layer of practicality, making advanced reasoning techniques accessible in resource-constrained environments.

In an article entitled "*LoRA: Low-Rank Adaptation of Large Language Models*", authored by Edward J. Hu et al., and published in 2021 in ICLR 2022, the content of which is incorporated herein by reference in its entirety, there is disclosed the LoRA adapters.

SUMMARY

Developers have devised methods and devices for overcoming at least some drawbacks present in prior art solutions.

In developing the present technology, the developers have developed a novel decoding technique that capitalizes on the unique characteristics of LoRA adapters. By leveraging the differences between the expert LoRA adapter and amateur base models during the decoding process, this approach enhances the generation of high-quality text while maintaining low computational requirements.

In the context of the present technology, a Large Language Models (LLM) is a neural network model designed to understand and generate human language by converting (sub)words into vector representations. Primarily trained for text generation, LLMs predict the next most probable (sub) word based on a given input (i.e., prompt), a process known as auto-regressive language modeling. LLMs can perform a variety of language tasks such as question-answering. For instance, given a prompt like "Who invented the light bulb?", the model can produce the answer "Thomas Edison" by repeatedly generating words based on the input prompt. The most advanced LLMs contain billions of trainable parameters and are trained on vast text corpora from various sources, including the Internet. LLMs can be customized for specific tasks through two main methods: fine-tuning, which involves adjusting the model's internal parameters, and/or prompt-engineering, which involves modifying the input prompt without changing the model's parameters.

In the context of the present technology, "decoding" is the process of transforming model outputs, such as logits, into actual text. In the context of LLMs, decoding strategies determine how the model selects words to form sentences. Common decoding methods include:

- Greedy Decoding: The model selects the word with the highest probability at each step. This can lead to repetitive or suboptimal sentences.
- Beam Search: This method keeps track of multiple sequences (beams) during generation, allowing for exploration of more possible outputs but increasing computational complexity.
- Sampling: The model randomly selects words based on their probabilities, introducing variability but potentially leading to less coherent outputs.

Contrastive Decoding (CD) is a decoding technique that enhances text generation by leveraging the outputs of multiple models. This technique involves comparing the outputs from a stronger, more sophisticated model (often referred to as the "expert" model) with those from a simpler, less capable model (the "amateur" model). The goal is to select the most contextually appropriate and high-quality text.

At each step of text generation, contrastive decoding evaluates the likelihood of potential next words or phrases from both the expert and amateur models. It then maximizes the positive difference in likelihood between these models, effectively filtering out generic or less informative outputs that the amateur model might produce. This process helps in generating more coherent, contextually relevant, and higher-quality text.

In the context of the present technology, "Low-Rank Adaptation (LoRA) adapters" are a method for efficiently fine-tuning large pre-trained language models. Instead of updating all model parameters during the fine-tuning process, LoRA introduces low-rank matrices that are added to existing weights. This significantly reduces the number of trainable parameters, making the process more computationally efficient while retaining the model's performance on specific tasks.

In the context of the present technology, "Amateur Model" refers to a model that operates at a basic level of performance, typically requiring more training or data to achieve competitive results.

In the context of the present technology, "Chain of Thought" refers to a sequence of intermediate reasoning steps in natural language that guides the model to arrive at a final output.

In the context of the present technology, "Expert Model" refers to a high-performing model that demonstrates advanced capabilities in specific tasks, often requiring extensive training and fine-tuning.

In the context of the present technology, "Few-Shot Prompting" refers to a method in which the model is provided with a small number of examples—usually between two and five—to facilitate quick adaptation to new instances of previously encountered objects.

In the context of the present technology, "Pre-trained Language Model" refers to a large neural network designed for a range of natural language processing tasks. They follow a pretrain-finetune paradigm, wherein models are first pretrained on extensive text corpora and subsequently fine-tuned on specific downstream tasks.

Developers have realized one or more disadvantages with the prior art. For example, underutilization of available resources: In the case of LoRA models, not updating the decoding method leaves valuable information on the table. This information is an easy way to increase performance. In another example, the model availability may be an issue: in the case of contrast decoding methods, smaller amateur models within the same family may not always be available, posing a challenge for implementation. In yet another example, memory usage may be an issue, as case of contrast decoding methods, there is a need to manage multiple models and their outputs can lead to higher memory usage.

In accordance with a broad aspect of some embodiments of the present technology, we let $$s_a^i$$

and $$s_e^i$$

be the unnormalized scores (logits) assigned to token i by the amateur and expert models, respectively. A LoRA adapter is used as one of the models (typically the expert). α is a hyperparameter for the proportion of the maximum probability assigned by the expert model, with any tokens assigned a lower probability masked out. β is a hyperparameter corresponding to the strength of the amateur penalty. A leading (1+β) coefficient to the expert logits is included to decouple the strength of the contrastive penalty from the expected scale of the output logits, cleanly delineating between the contrastive tradeoff and the final sampling temperature.

This method boils down to two steps: Determine the α-mask.

$$V_{valid} = \left\{ j \in V,\ s_e^j \geq \log\alpha + \max_{k \in V} s_e^k \right\}$$

Subtract the amateur logits $$s_{CD}^i \begin{cases} (1+\beta)s_e^i - \beta s_a^i & i \in V_{valid} \\ -\infty & i \notin V_{valid} \end{cases}.$$

Accordingly, some of the limitations of Contrastive Decoding in enhancing the reasoning capabilities of LLMs are addressed. For example, the following non-limitative problems may be addressed:

- Dependency on Smaller Models: CD typically requires a smaller amateur model, which may not always be available.
- High Computational Resource Demands: CD needs both an expert and an amateur model loaded into memory simultaneously, increasing resource usage.

In some embodiments, utilizing the knowledge difference between LoRA Adapters and the base model in the decoding scheme may enhance the learned knowledge and therefore the performance.

In some embodiments, compared to traditional contrastive decoding schemes which solely rely on pre-trained large language models, the present technology removes dependency on additional models and thereby allows for usage in resource scarce environments.

In some embodiments, the present technology could be applied to other domains, such as audio, image or video applications.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers. It can be said that a database is a logically ordered collection of structured data kept electronically in a computer system.

In the context of the present specification, the expression "information" includes information of any nature or kind whatsoever capable of being stored in a database. Thus, information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
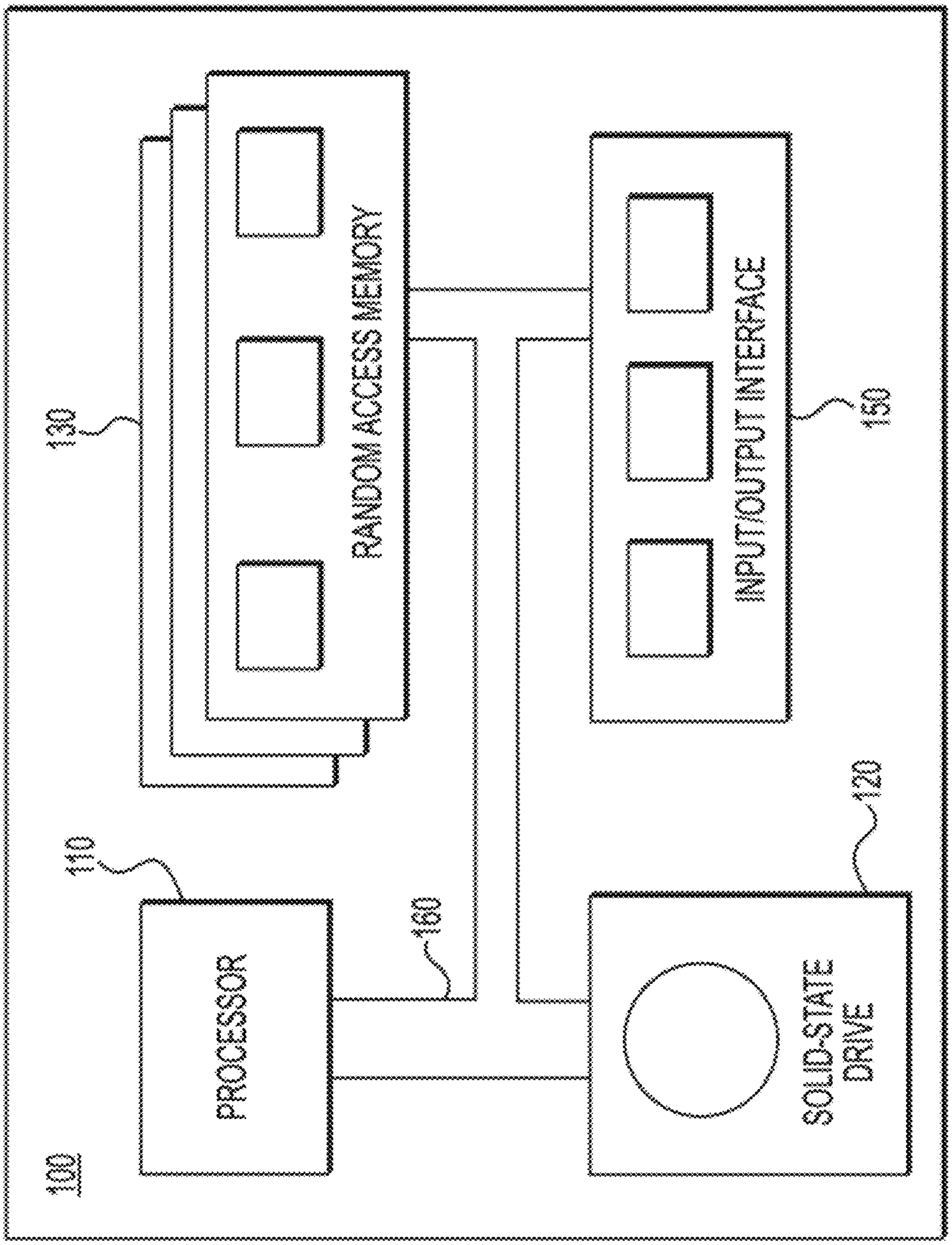
FIG. 1 illustrates an example of a computing device that may be used to implement any of the methods described herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

FIG. 1 illustrates a diagram of a computing environment 100 in accordance with an embodiment of the present technology is shown. In some embodiments, the computing environment 100 may be implemented by any of a conventional personal computer, a computer dedicated to operating and/or monitoring systems relating to a data center, a controller and/or an electronic device (such as, but not limited to, a mobile device, a tablet device, a server, a controller unit, a control device, a monitoring device etc.) and/or any combination thereof appropriate to the relevant task at hand. In some embodiments, the computing environment 100 comprises various hardware components including one or more single or multi-core processors collectively represented by a processor 110, a solid-state drive 120, a random access memory 130 and an input/output interface 150.

In some embodiments, the computing environment 100 may also be a sub-system of one of the above-listed systems. In some other embodiments, the computing environment 100 may be an "off the shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Communication between the various components of the computing environment 100 may be enabled by one or more internal and/or external buses 160 (e.g. a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wire or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the random access memory 130 and executed by the processor 110 for executing operating data centers based on a generated machine learning pipeline. For example, the program instructions may be part of a library or an application.

In some embodiments of the present technology, the computing environment 100 may be implemented as part of a cloud computing environment. Broadly, a cloud computing environment is a type of computing that relies on a network of remote servers hosted on the internet, for example, to store, manage, and process data, rather than a local server or personal computer. This type of computing allows users to access data and applications from remote locations, and provides a scalable, flexible, and cost-effective solution for data storage and computing. Cloud computing environments can be divided into three main categories: Infrastructure as a Service (IaaS), Platform as a Service (PaaS), and Software as a Service (SaaS). In an IaaS environment, users can rent virtual servers, storage, and other computing resources from a third-party provider, for example. In a PaaS environment, users have access to a platform for developing, running, and managing applications without having to manage the underlying infrastructure. In a SaaS environment, users can access pre-built software applications that are hosted by a third-party provider, for example. In summary, cloud computing environments offer a range of benefits, including cost savings, scalability, increased agility, and the ability to quickly deploy and manage applications.

Figure 2:
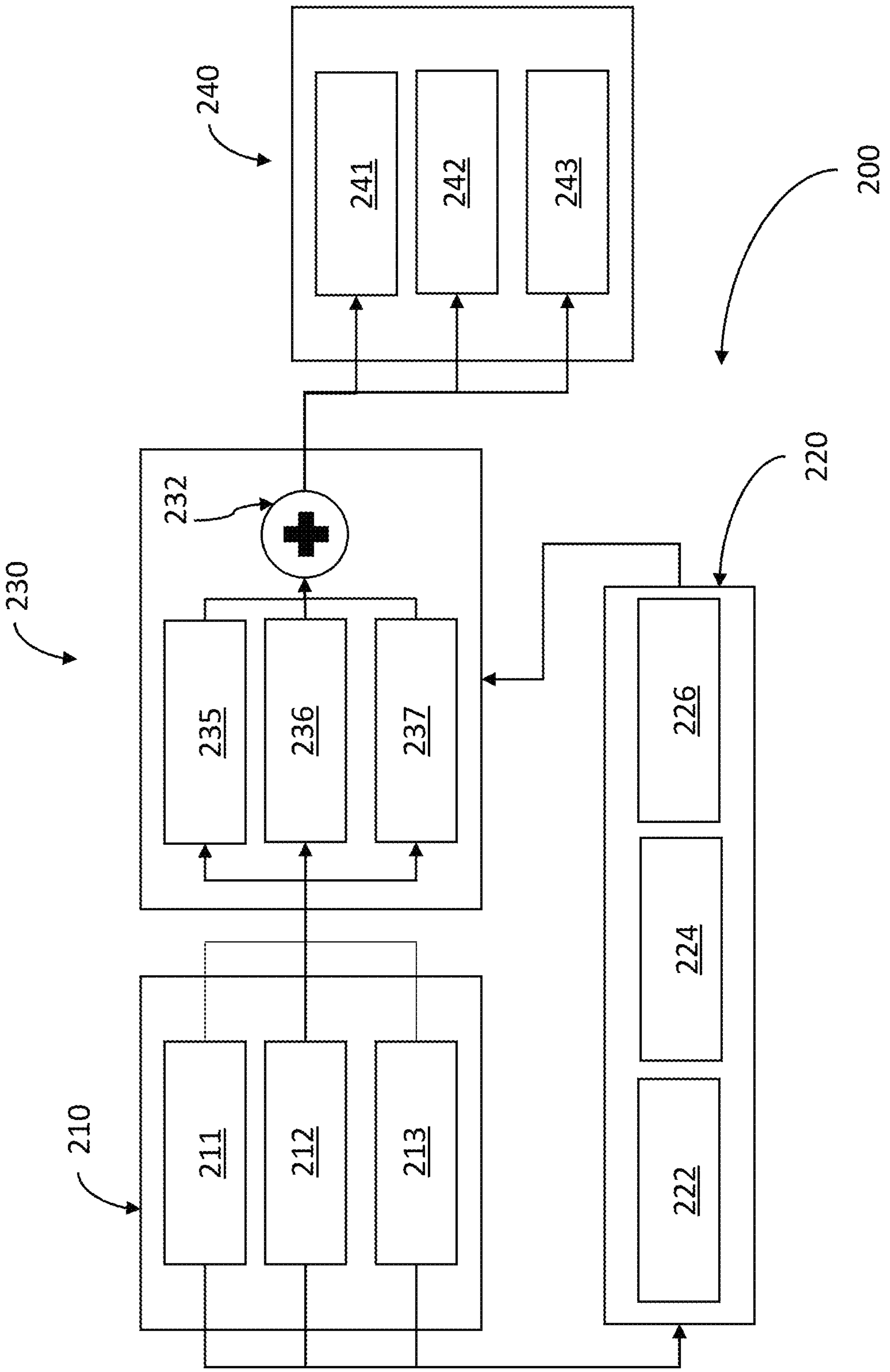
FIG. 2 an example system architecture for the multi-lora setup where a decoding method occurs within the (+) step in the GPU memory.

With reference to FIG. 2, there is depicted an exemplary system architecture 200 for a multi-LoRA setup. It should be understood that a single LoRA set up is also contemplated. It is contemplated that the system architecture 200 is implemented in the computing environment 100 illustrated in FIG. 1.

In this embodiment, the system architecture 200 comprises an input request batch 210, comprising three types of tasks. For example, the first task 211 is an arithmetic task, the second task 212 is a code generation task, and the third task 213 is a summarization task. Needless to say, it also contemplated that other types of task be included, such as chatbot task, content generation task, translation task, and so on.

The available adapters 220 comprises a set of LoRA adapters, comprising a first adapter 222 trained for arithmetic tasks, a second adapter 224 trained for code generation tasks, a third adapter 226 trained for summarization tasks. Needless to say, it also contemplated that other type of LoRA adapters be included, such as a LoRA adapter trained for chatbot tasks, content generation tasks, translation tasks, and so on. It is contemplated that the available adapters 220 be either user-trained or from a library. When a task is received (i.e. one of the first task 211, second task 212, and third task 213), the user may specify the LoRa model name/adapter ID to specify which of the available adapters the task is sent to. In some embodiments, when the request for a customized model (i.e. one of the available adapters 220), the associated adapter (ex. the first adapter 222 for a first task 211) is pulled from the library into a cache. Each of the available adapters 220 is configured to generate a LoRA output based on the task.

The architecture 200 further comprises foundational model weights, such as a first foundational model 235, a second foundational model 236 and a third foundational model 237, where each which also configured to receive the one or more of the first task 211, the second task 212 and the third task 213 to generate a respective foundational model output. How a given foundational model is implemented is not limited. For example, the first foundational model 235 may be implemented as a LLaMa-2 7B.

The Large Language Model Meta AI (LLaMA) is a family of transformer-based language models optimized for computational efficiency and scalability. Developed by Meta, LLaMA models employ an autoregressive transformer structure with substantial parameter sets, designed to maximize performance on standard hardware without excessive computational requirements. LLaMA's architecture leverages an autoregressive, self-attentive mechanism that enables efficient text generation by sequentially predicting tokens in a coherent manner. By balancing parameter size and computational accessibility, LLaMA is suitable for applications in text generation, interactive dialogue systems, and language translation, achieving a versatile operational capacity for diverse NLP tasks.

In some embodiments, the first adapter 222 is trained on the first foundational model 235, the second adapter 224 is trained on the second foundational model 236, and the third adapter 226 is trained on the third foundational model 237.

A decoding method 232 (described in more detail below), occurs within the GPU memory 230 after a respective foundational model output and LoRA output is generated. The decoding method 232 yields a set of responses 240 for the tasks it has received, such that a first response 241 is generated for the first task 211, a second response 242 is generated for the second task 212, and a third response 243 is generated for the third task 213.

In some embodiments, during the in-use phase, data simultaneously flows through both the foundation model and multiple different LoRA adapters. This technique enables responses to requests for multiple different custom models at the same time.

Figure 3:
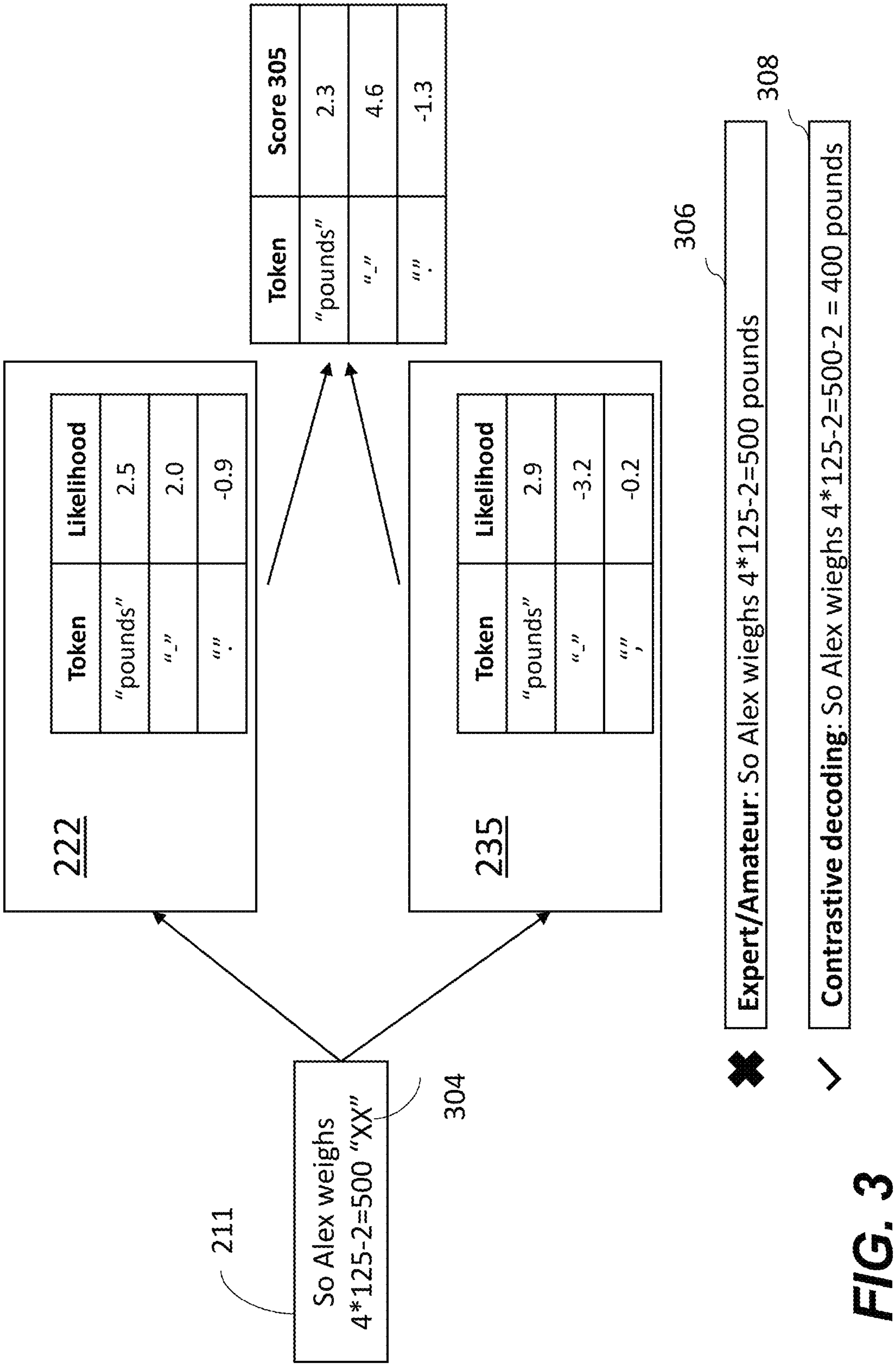
FIG. 3 is a schematic illustration of the steps for generating a text, in accordance with at least some non-limiting embodiments of the present technology.

With reference to FIG. 3, there is depicted a schematic illustration of the steps for generating a text, in accordance with at least some non-limiting embodiments of the present technology.

Let us assume that the first task 211 is inputted in in the first adapter 222 and the first foundational model 235. In the non-limiting example, the first task 211 is an arithmetic-type of task, where the first adapter 222 and the first foundational model 235 has to determine the output token for a given sequence 304 (identified as "XX") of the final output text sequence.

Arithmetic reasoning involves performing calculations or understanding numerical relationships within a textual context, requiring the model to manage quantitative data accurately. LoRA adapters (such as the first adapter 222) configured for arithmetic reasoning can target neural pathways responsible for handling numerical relationships and mathematical operations, enhancing the model's ability to solve arithmetic problems or execute multi-step calculations. By adapting the attention weights associated with numerical patterns and sequences, the model is better equipped to interpret and process arithmetic-based queries.

In response to receiving the first task 211, the first adapter 222 is configured to generate a likelihood score to each of a plurality of candidate tokens. For example, the first adapter 222 assigns a likelihood score of 2.5 to the token "pounds", 2.0 to the token "–" (i.e. a subtraction symbol), and −0.9 to the token "." (i.e. a full-stop). Although only three candidate tokens are illustrated, this is done for ease of illustration. It should be understood that the first adapter 222 is configured to assign a likelihood score to more than three candidate tokens.

In response to receiving the first task 211, the first foundational model 235 is also configured to generate a likelihood score to each of a plurality of candidate tokens. For example, the first foundational model 235 assigns a likelihood score of 2.9 to the token "pounds", −3.2 to the token "–" (i.e. a subtraction symbol), and −0.2 to the token "." (i.e. a full-stop). Although only three candidate tokens are illustrated, this is done for ease of illustration. It should be understood that the first foundational model 235 is configured to assign a likelihood score to more than three candidate tokens.

In the present example, both the first foundational model 235 and the first adapter 222 has assigned the highest likelihood score to the token "pounds". However, it is the incorrect candidate token, as illustrated in an incorrect final output text sequence 306.

Rather, having generated the likelihood score for each candidate tokens, the processor 110 is further configured to execute the decoding method 232. More specifically, the decoding method 232 implemented a contrastive decoding method, where, at each step of text generation, it evaluates the likelihood of potential next words or phrases from both the expert (i.e. the first adapter 222) and the amateur model (i.e. the first foundational model 235). It then maximizes the positive difference in likelihood between these models, effectively filtering out generic or less informative outputs that the amateur model might produce. This process helps in generating more coherent, contextually relevant, and higher-quality text. How the contrastive decoding method evaluates the likelihood is not limited, and may be by assigning a contrastive decoding score 305 to each candidate tokens. In some non-limiting embodiments, the contrastive score $$s_{CD}^{i}$$

for a candidate token i is calculated using the formula:

$$s_{CD}^{i}\begin{cases}(1+\beta)s_{e}^{i}-\beta s_{a}^{i} & i\in V_{valid}\\ -\infty & i\notin V_{valid}\end{cases}$$

wherein $$s_e^i$$

represents the likelihood score from the expert model (i.e. the first adapter 222) for token i; Where $$s_a^i$$

represents the likelihood score from the amateur model (i.e. the first foundational model 235) for token i; Where β is a weighting factor that determines the influence of the amateur model's score on the final score.

Masking unlikely tokens is done by defining a valid set of tokens $V_{valid}$ based on the expert model's likelihood scores; The valid set of tokens $V_{valid}$ is determined using the formula:

$$V_{valid} = \left\{ j \in V,\ s_e^j \geq \log\alpha + \max_{k \in V} s_e^k \right\}$$

wherein α is a threshold parameter.

In the illustration, the processor 110 identifies the token "-" as having the highest contrastive decoding score 305, and as such, the processor 110 is configured to select the token "-" as a token for a correct final output text sequence 308.

Figure 4:
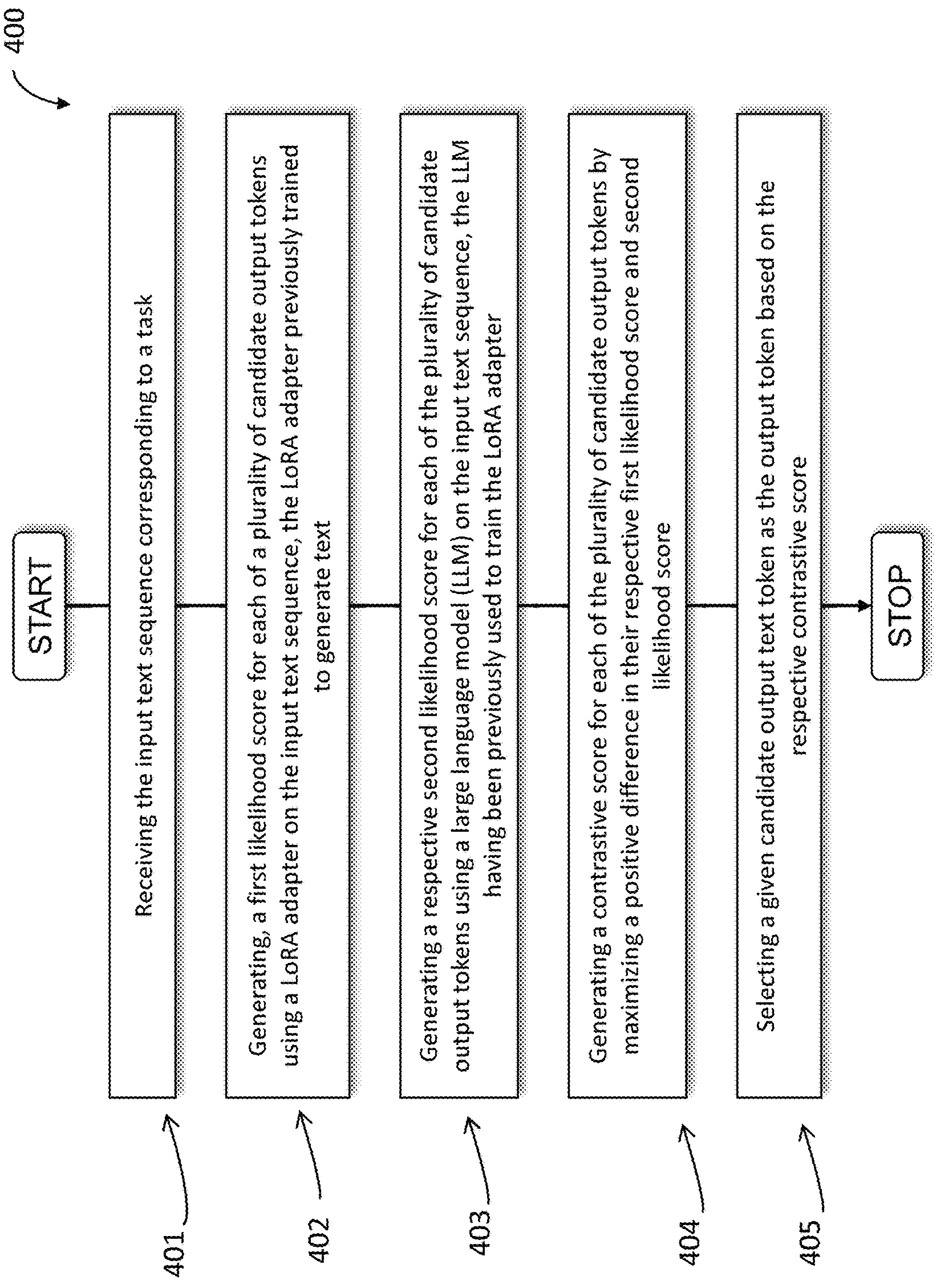
FIG. 4 is a scheme-block illustration of a method executable by a processor of the computing environment of FIG. 1, in accordance with at least some non-limiting embodiments of the present technology.

With reference to FIG. 4, a scheme-block illustration of a method 400 executable by the processor 110 of the computing environment of FIG. 1, for generating text in a natural language processing system.

STEP 401: receiving an input text sequence corresponding to a task.

At step 401, the first task 211 is inputted by a user (not shown), and transmitted to the first adapter 222 and the first foundational model 235.

STEP 402: generating, a first likelihood score for each of a plurality of candidate output tokens using a LoRA adapter on the input text sequence, the a LoRA adapter previously trained to generate text At step 402, In response to receiving the first task 211, the first adapter 222 is configured to generate a likelihood score to each candidate tokens. For example, the first adapter 222 assigns a likelihood score of 2.5 to the token "pounds", 2.0 to the token "–" (i.e. a subtraction symbol), and –0.9 to the token "." (i.e. a full-stop).

STEP 403: Generating a respective second likelihood score for each of the plurality of candidate output tokens using a large language model (LLM) on the input text sequence, the LLM having been previously used to train the LoRA adapter At step 403, In response to receiving the first task 211, the first foundational model 235 is also configured to generate a likelihood score to each candidate tokens. For example, the first foundational model 235 assigns a likelihood score of 2.9 to the token "pounds", –3.2 to the token "–" (i.e. a subtraction symbol), and –0.2 to the token "." (i.e. a full-stop).

STEP 404: Generating a contrastive score for each of the plurality of candidate output tokens by maximizing a positive difference in their respective first likelihood score and second likelihood score At step 405, the processor 110 is configured to execute the decoding method 232 to generate the contrastive score for each candidate token. In some embodiments, the contrastive score $$s_{CD}^i$$

for a candidate text sequence i is calculated using the formula:

$$s_{CD}^i \begin{cases} (1+\beta)s_e^i - \beta s_a^i & i \in V_{valid} \\ -\infty & i \notin V_{valid} \end{cases}$$

wherein $$s_e^i$$

represents the likelihood score from the expert model (i.e. the first adapter 222) for token i; Where $$s_a^i$$

represents the likelihood score from the amateur model (i.e. the first foundational model 235) for token i; Where β is a weighting factor that determines the influence of the amateur model's score on the final score.

Masking unlikely tokens is done by defining a valid set of tokens $V_{valid}$ based on the expert model's likelihood scores; The valid set of tokens $V_{valid}$ is determined using the formula:

$$V_{valid} = \left\{ j \in V,\ s_e^j \geq \log\alpha + \max_{k \in V} s_e^k \right\}$$

wherein α is a threshold parameter.

STEP 405: Selecting a given candidate output text token as the output token based on the respective contrastive score.

At step 406, the processor 110 identifies the token "-" as having the highest contrastive decoding score 305, and as such, the processor 110 is configured to select the token "-" as a token for a correct final output text sequence 308.

While the above-described implementations have been described and shown with reference to particular operations performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It will be appreciated that at least some of the operations of the method 400 may also be performed by computer programs, which may exist in a variety of forms, both active and inactive. Such as, the computer programs may exist as software program(s) comprised of program instructions in source code, object code, executable code or other formats. Any of the above may be embodied on a computer readable medium, which include storage devices and signals, in compressed or uncompressed form. Representative computer readable storage devices include conventional computer system RAM (random access memory), ROM (read only memory), EPROM (erasable, programmable ROM), EEPROM (electrically erasable, programmable ROM), and magnetic or optical disks or tapes. Representative computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

In another non-limiting embodiment, instead of using Llama, it is contemplated that other models be used, such as GPT, BERT, MISTRAL or other models.

The Generative Pre-trained Transformer (GPT) is an autoregressive language model architecture that utilizes a multi-layer transformer network to process sequential input data. Developed by OpenAI, GPT is structured to predict subsequent data tokens in a sequence, based on preceding tokens, through a self-attention mechanism that adjusts weights across input data. The model's autoregressive nature enables it to generate contextually coherent text by learning dependencies within the input sequence. GPT's architecture and training allow it to perform various natural language processing (NLP) functions, such as text generation, machine translation, and dialogue interaction, by utilizing learned contextual relationships to produce text with human-like linguistic coherence.

Bidirectional Encoder Representations from Transformers (BERT) is a deep bidirectional language model that encodes contextual information from both preceding and succeeding text tokens within a sequence. Developed by Google, BERT's architecture employs a bidirectional self-attention mechanism, enabling it to process data in a fully connected manner by learning token relationships on either side of a masked token. BERT is pre-trained using a masked language model approach, wherein select tokens in input text sequences are masked, and the model learns to predict the masked tokens based on context from both directions. This bidirectional encoding enables BERT to achieve high accuracy in tasks requiring semantic comprehension, including text classification, question answering, and entity recognition.

Mistral is an advanced language model architecture developed by Mistral AI, which prioritizes computational efficiency and high-performance language processing. Mistral models employ dense transformer architectures, as exemplified by Mistral 7B, alongside sparse-dense hybrid variants, such as Mixtral, which incorporate sparse attention mechanisms to optimize processing efficiency. The Mistral models leverage structured attention methods to process token sequences with reduced computational demands while maintaining high accuracy in language modeling tasks. This design enables Mistral models to perform NLP functions, including text generation and conversational modeling, with enhanced resource efficiency, making them applicable for deployment across various hardware environments.

In another non-limiting embodiment, it is contemplated that of the invention would be hyperparameter variations. How the hyperparameters $\alpha$ and $\beta$ is determined is not limited, and may be determined empirically. Different values for the hyperparameters $\alpha$ and $\beta$, can impact performance across various tasks.

Another non-limiting embodiment involves task-specific adjustments. It is contemplated that the LoRA adapters be trained for specific types of reasoning tasks, such as chatbot reasoning, commonsense reasoning, or factual recall using different LoRA adapters.

In the field of natural language processing, specific reasoning tasks such as chatbot reasoning, commonsense reasoning, and factual recall require distinct processing approaches, which can be enhanced by using LoRA adapters to optimize model performance on these tasks. LoRA adapters modify select layers within a pre-trained model, allowing for task-specific fine-tuning while retaining overall model efficiency. Each reasoning task presents unique requirements, which LoRA adapters can address by focusing on relevant model parameters.

Commonsense reasoning refers to the model's capacity to interpret general knowledge and make inferences that align with human intuition or common experiences. LoRA adapters optimized for commonsense reasoning adjust the model's layers to prioritize parameters involved in understanding contextual clues, causal relationships, and everyday concepts. This adaptation process allows the model to generate responses that reflect basic assumptions and logical inferences, such as understanding the typical sequence of events or the relationships between objects and actions. Commonsense reasoning LoRA adapters thus improve the model's capacity for inference, enabling responses that exhibit an enhanced understanding of implicit knowledge.

Factual recall tasks require the model to retrieve specific, accurate information from its training corpus, such as historical dates, scientific facts, or other well-documented knowledge. For factual recall, LoRA adapters can focus on strengthening associations within the model that connect factual data points to relevant queries, thereby improving the accuracy of the model's recall. By fine-tuning specific attention layers associated with memorization and retrieval, factual recall LoRA adapters enhance the model's response precision when presented with fact-based inquiries.

It is further contemplated that the present system be implemented in conjunction with chain-of-thought/self-consistency prompting. For example, chain-of-thought could be used as an add-on to the LoRA adapter to create a larger accuracy gap between the LoRA adapter and the foundational model. Essentially, the LoRA adapter would be required to explain its reasoning prior to outputting the final answer, but not the foundational model.

In natural language processing, specific techniques such as chain-of-thought prompting, self-consistency, and various sampling methods are used to enhance the accuracy, coherence, and reliability of responses generated by language models. These techniques improve the model's ability to handle complex reasoning tasks and generate responses that better align with human expectations.

Chain-of-thought prompting involves guiding the model to produce intermediate steps or reasoning processes before arriving at a final answer. By structuring the prompt to include a sequence of logical steps, chain-of-thought prompting enables the model to break down complex tasks and provide more accurate and interpretable responses. This approach is particularly useful in multi-step reasoning tasks, where intermediate steps clarify the model's reasoning path. Chain-of-thought prompting allows for responses that reveal underlying logical processes, resulting in answers that are not only accurate but also easier to verify and understand.

Self-consistency is a technique that enhances the reliability of a model's output by generating multiple responses to the same prompt and selecting the most consistent answer across these iterations. By sampling multiple completions and then aggregating or selecting the most frequent or logical response, self-consistency reduces the influence of random sampling variability and reinforces the response that aligns best with the model's overall knowledge. This method is particularly valuable for tasks requiring logical consistency or factual accuracy, as it helps mitigate issues of randomness or inconsistency that can arise in single-response outputs.

Sampling techniques, such as temperature sampling, top-k sampling, and nucleus (top-p) sampling, are used to control the variability and specificity of responses generated by the model. Temperature sampling adjusts the probability distribution over possible next tokens, where lower temperatures produce more focused responses and higher temperatures encourage creative or diverse outputs. Top-k sampling limits the model to choosing among the top k most probable next tokens, reducing randomness by restricting token selection to more likely options. Nucleus sampling (top-p) limits the cumulative probability of potential tokens, allowing the model to consider a flexible subset of tokens that together cover a specified probability threshold. Each sampling technique serves to fine-tune response generation according to the task's requirements, allowing for a balance between accuracy, creativity, and coherence.

Using the difference between the knowledge contained in a LoRA adapter and the amateur model to adapt the decoding method allows for enhanced performance on downstream tasks (the task the LoRa adapter was trained on) without having to do additional training and with very minimal overhead.

Using a LoRA Adapter as the expert model allows for (a) model availability; as smaller amateur models within the same family may not always be available, posing a challenge for implementing contrastive decoding. By using a FT LoRA adapter, this issue is solved by the present technology. The untuned version acts as the amateur, and the tuned version acts as our expert, and (b) memory usage; as the need to manage multiple models and their outputs can lead to higher memory usage. To get around this, we use LoRA adapters which aid in three ways. 1) Low-Rank Matrices: LoRA introduces low-rank matrices to the model, which are significantly smaller than the full-rank weight matrices. This reduces the overall memory footprint required to store the model parameters. 2) Frozen Base Model: During inference, the base model's parameters remain frozen, and only the low-rank matrices are used to adapt the model. This means that the memory required for storing and accessing the base model's parameters does not increase. 3) Efficient Parameter Storage: By focusing on low-rank adaptations, LoRA can store the necessary adjustments in a compact form. This efficient storage reduces the overall memory needed for the model.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for generating an output token for an output text sequence based on an input text sequence by a natural language processing system, the method comprising:

receiving the input text sequence corresponding to a task;

generating, a first likelihood score for each of a plurality of candidate output tokens using a LoRA adapter on the input text sequence, the LoRA adapter previously trained to generate text;

generating a respective second likelihood score for each of the plurality of candidate output tokens using a large language model (LLM) on the input text sequence, the LLM having been previously used to train the LoRA adapter;

generating a contrastive score for each of the plurality of candidate output tokens by maximizing a positive difference in their respective first likelihood score and second likelihood score; and selecting a given candidate output text token as the output token based on the respective contrastive score.

2. The method of claim 1, wherein the generating the contrastive score comprises generating the contrastive score in accordance with:

$$s_{CD}^{i}\begin{cases}(1+\beta)s_e^i-\beta s_a^i & i\in V_{valid}\\ -\infty & i\notin V_{valid}\end{cases}$$

wherein $$s_{CD}^{i}$$

represents a candidate text sequence i, $$s_e^i$$

represents the likelihood score from the LoRA adapter for token i, $$s_a^i$$

represents the likelihood score from the LLM for token i, β is a weighting factor that determines an influence of the LLM's score on a final score.

3. The method of claim 2, wherein the generating the contrastive score comprises defining a valid set of tokens $V_{valid}$ based on the LoRA adapter's likelihood scores in accordance with:

$$V_{valid}=\left\{j\in V,\ s_e^j\geq \log\alpha+\max_{k\in V} s_e^k\right\}$$

wherein $V_{valid}$ is a valid set of tokens α is a threshold parameter.

4. The method of claim 1, wherein the LLM is at least one of: GPT based model, BERT based model, MISTRAL based model.

5. The method of claim 1, wherein at least one of the LoRA adapter and the LLM have different values for the hyperparameters α and β.

6. The method of claim 1, wherein the task is one of a reasoning task, an arithmetic reasoning task, a commonsense reasoning task, and a factual recall task.

7. The method of claim 1, further comprising, selecting the LoRA adapter from a library of LoRA adapters based on a task associated with the input text sequence.

8. A natural language processing system to generate an output token for an output text sequence based on an input text sequence, the natural language processing system comprising a processor configured to:

receive the input text sequence corresponding to a task;

generate, a first likelihood score for each of a plurality of candidate output tokens using a LoRA adapter on the input text sequence, the LoRA adapter previously trained to generate text;

generate a respective second likelihood score for each of the plurality of candidate output tokens using a large language model (LLM) on the input text sequence, the LLM having been previously used to train the LoRA adapter;

generate a contrastive score for each of the plurality of candidate output tokens by maximizing a positive difference in their respective first likelihood score and second likelihood score; and select a given candidate output text token as the output token based on the respective contrastive score.

9. The system of claim 8, wherein to generate the contrastive score, the processor is configured to generate the contrastive score in accordance with:

$$s_{CD}^{i}\begin{cases}(1+\beta)s_e^i-\beta s_a^i & i\in V_{valid}\\ -\infty & i\notin V_{valid}\end{cases}$$

wherein $$s_{CD}^{i}$$

represents a candidate text sequence i, $$s_e^i$$

represents the likelihood score from the LoRA adapter for token i, $$s_a^i$$

represents the likelihood score from the LLM for token i, β is a weighting factor that determines an influence of the LLM's score on a final score.

10. The system of claim 9, wherein to generate the contrastive score, the processor is configured to define a valid set of tokens $V_{valid}$ based on the LoRA adapter's likelihood scores in accordance with:

$$V_{valid}=\left\{j\in V,\ s_e^j\geq \log\alpha+\max_{k\in V}s_e^k\right\}$$

wherein $V_{valid}$ is a valid set of tokens α is a threshold parameter.

11. The system of claim 8, wherein the LLM is at least one of: GPT based model, BERT based model, MISTRAL based model.

12. The system of claim 8, wherein at least one of the LoRA adapter and the LLM have different values for the hyperparameters α and β.

13. The system of claim 8, wherein the task is one of a reasoning task, an arithmetic reasoning task, a commonsense reasoning task, a factual recall task.

14. The system of claim 8, the processor being configured to, select the LoRA adapter from a library of LoRA adapters based on a task associated with the input text sequence.

* * * * *